United States Patent
Milstein et al.

(10) Patent No.: US 6,713,466 B2
(45) Date of Patent: Mar. 30, 2004

(54) PROCESSES FOR PREPARING STEROL ESTERS

(75) Inventors: Norman Milstein, Montgomery, OH (US); Manfred Biermann, Cincinnati, OH (US); Peter Leidl, Illertissen (DE); Rainer von Kries, Illertissen (DE)

(73) Assignee: Cognis Corporation, Ambler, PA (US)

( * ) Notice: Subject to any disclaimer, the term of this patent is extended or adjusted under 35 U.S.C. 154(b) by 0 days.

(21) Appl. No.: 10/126,284

(22) Filed: Apr. 19, 2002

(65) Prior Publication Data

US 2002/0131991 A1 Sep. 19, 2002

Related U.S. Application Data

(60) Division of application No. 09/083,584, filed on May 21, 1998, now Pat. No. 6,394,230, which is a continuation-in-part of application No. 09/072,434, filed on May 4, 1998, now abandoned.
(60) Provisional application No. 60/069,790, filed on Dec. 16, 1997.

(51) Int. Cl.$^7$ .............................. A61K 31/56; B06B 1/00
(52) U.S. Cl. .................. 514/182; 514/120; 514/171; 552/554; 552/545; 552/544; 426/804; 426/605; 426/611; 426/601; 426/267
(58) Field of Search .................. 426/804, 605, 426/611, 601, 267; 552/554, 545, 544; 514/170, 171, 182

(56) References Cited

U.S. PATENT DOCUMENTS

| | | |
|---|---|---|
| 2,309,949 A | 2/1943 | Gooding .................. 260/411 |
| 4,588,717 A | 5/1986 | Mitchell |
| 4,698,360 A | 10/1987 | Masquelier |
| 5,219,733 A * | 6/1993 | Myojo et al. ................. 435/52 |
| 5,244,887 A | 9/1993 | Straub |
| 5,266,690 A | 11/1993 | McCurry, Jr. et al. |
| 5,270,041 A | 12/1993 | Eugster et al. |
| 5,449,763 A | 9/1995 | Wulff et al. |
| 5,502,045 A * | 3/1996 | Miettinen et al. ........... 514/182 |
| 5,514,398 A | 5/1996 | Imai et al. |
| 5,563,131 A | 10/1996 | Berliner et al. |
| 5,883,087 A | 3/1999 | Berliner et al. |
| 5,892,068 A * | 4/1999 | Higgins, III ................ 552/554 |
| 6,139,872 A | 10/2000 | Walsh |
| 6,147,236 A * | 11/2000 | Higgins, III ................ 552/554 |
| 6,413,571 B1 * | 7/2002 | Liu ............................ 426/611 |
| 2002/0098536 A1 * | 7/2002 | Norinobu et al. ............. 435/52 |

FOREIGN PATENT DOCUMENTS

| GB | 2 285 805 | 7/1995 |
|---|---|---|
| WO | WO 99/15546 | 4/1999 |
| WO | WO 99/15547 | 4/1999 |

OTHER PUBLICATIONS

Kireeva et al. (DN 119:205726, CAPLUS, abstract of Gldroliznaya i Lesokhimicheskaya Promyshlennos (1991), (3), 16–17).*
Chrysam, et al., Bailey's Industrial Oil and Fat Products, John Wiley & Sons, 1985, vol. 3, pp. 77–84.
Formo, et al., Bailey's Industrial Oil Fat Products, John Wiley & Sons, 1979, 4th Edition, vol. 1, Chapter 6, pp. 289–477.
Miettinen, et al., "Reduction of Serum Cholesterol With Sitostanol–Ester Margarine in a Mildly Hypercholesterolemic Population", The New England Journal of Medicine, Nov. 16, 1995, vol. 333, No. 20, pp. 1308–1312.
Ling, et al., "Dietary Phytosterols: A Review of Metabolism, Benefits and Side Effects", Life Sciences, 1995, Vol. 57, No. 3, pp. 195–206.
Vanhanen, et al., "Serum Cholesterol, Cholesterol Precursors, and Plant Sterols in Hypercholesterolmic Subjects With Different apoE Phenotypes During Dietary Sitostanol Ester Treatment", Journal of Lipid Research, 1993, vol. 34, pp. 1535–1544.
R.I. Kireeva et al. (CA 119:205726, abstract of Gidroliz Lesokhim Prom–st., vol. 3, (1991), pp. 16–17).
Copy of PCT Written Opinion dated Jan. 10, 2000 in International Application No. PCT/US98/26212 (6 pgs.).
Eugster et al. (CA 120:245603, abstract of CH 681891), 1993.
Chemical Abstracts, vol. 119, No. 20, Nov. 15, 1993 Columbus, Ohio, US; Abstract No. 205726p, R.I. Kireeva et al.: "Manufacture of Elkan A 120", p. 136; col. 2; XP002226617 *Abstract* & Gidroliz. Lesokhim. Prom–St., No. 3, 1991, pp. 16–17.

* cited by examiner

*Primary Examiner*—Sabiha Qazi
(74) *Attorney, Agent, or Firm*—John E. Drach; Aaron R. Ettelman

(57) ABSTRACT

A food additive useful for lowering serum cholesterol in humans contains a sterol or stanol ester of a fatty acid or a dicarboxylic acid ester of a sterol or stanol made by reacting a sterol, stanol and a carboxylic acid in the presence of an effective amount of a catalyst selected from the group consisting of calcium oxide, calcium hydroxide, a calcium salt of a carboxylic acid, magnesium hydroxide and combinations thereof described herein below.

19 Claims, No Drawings

PROCESSES FOR PREPARING STEROL ESTERS

CROSS-REFERENCE TO RELATED APPLICATIONS

This application claims priority under 35 U.S.C. §120, and is a divisional application of, U.S. patent application Ser. No. 09/083,584, filed May 21, 1998 (now U.S. Pat. No. 6,394,230); which is a continuation-in-part of U.S. patent application Ser. No. 09/072,434, filed May 4, 1998 (now abandoned), which in turn claimed priority under 35 U.S.C. §119(e), of U.S. Provisional Patent Application No. 60/069,790, filed Dec. 16, 1997 (now expired), the entire contents of each of the aforementioned patent applications being incorporated herein by reference.

STATEMENT REGARDING FEDERALLY SPONSORED RESEARCH OR DEVELOPMENT

Not Applicable.

BACKGROUND OF THE INVENTION

Phytosterols have been found to be effective in reducing serum cholesterol in humans. Phytosterols are steroids that bear a close structural relationship to cholesterol but differ in the configuration of the side chains at the 17-position. It is well known that β-sitosterol and the fatty acid esters of β-sitosterol are effective in reducing serum cholesterol. Recent studies have found that β-sitostanol and the fatty acid esters of β-sitostanol are particularly effective in reducing serum cholesterol and LDL levels. It has been recently reported that the fatty acid esters of β-sitostanol are particularly effective cholesterol-reducing agents presumably because they are in solution. Such esters can be introduced into the body as additives in food products such as margarine. Margarines containing β-sitosterol and those containing β-sitosterol fatty acid esters as well as margarines containing β-sitostanol and β-sitostanol fatty acid esters have been shown to reduce serum cholesterol levels in humans.

BRIEF SUMMARY OF THE INVENTION

The present invention pertains to a food additive containing a sterol or stanol ester of a fatty acid or a dicarboxylic acid ester of a sterol or stanol made by the process described herein below. The food additive can be incorporated into food for the purpose of lowering serum cholesterol in humans and/or for reducing the absorption of cholesterol from foods and/or beverages. The food additive is prepared by combining a sterol and/or stanol fatty acid ester thereof and/or a dicarboxylic acid ester of a sterol or stanol made by the process described herein and an edible solubilizing agent, an effective amount of a suitable antioxidant and an effective amount of a suitable dispersant. The sterol and/or stanol esters made by the process described herein can be used without removing the catalyst because the catalyst is non-toxic and used at low levels. Another advantage is that when the fatty acid esters of sterols or stanols are prepared by transesterification, the ester that is transesterified can be either a lower alkyl ester such as a methyl or an ethyl ester or a triglyceride which is a triglyceryl ester of a $C_{6-22}$ fatty acid such as a conventional fat or oil.

Another aspect of the invention pertains to a method of reducing the absorption of cholesterol into the bloodstream which comprises orally introducing into the body an effective amount of a substance containing a β-sitostanol ester made by reacting a stanol and a carboxylic acid in the presence of an effective amount of a catalyst selected from the group consisting of calcium oxide, calcium hydroxide, a calcium salt of a carboxylic acid, magnesium hydroxide and combinations thereof.

BRIEF DESCRIPTION OF THE SEVERAL VIEWS OF THE DRAWING

Not Applicable.

DETAILED DESCRIPTION OF THE INVENTION

The term sterol is well known to those skilled in the art and generally refers to those compounds having a perhydrocyclopentanophenanthrene ring system (the ring system depicted in Formula III herein) and having one or more OH substituents, examples of which include, but are not limited to, cholesterol, campesterol, ergosterol, sitosterol, and the like. It is common to obtain sterols as mixtures of compounds such as, for example, GENEROL® 122N sterols, a trademark product of Henkel Corporation, Gulph Mills, Pa. GENEROL® 122N sterol contains 25–30% campesterol, 17–22% stigmasterol and 45–50% sitosterol.

The term stanol is well known to those skilled in the art and generally refers to those compounds having a saturated perhydrocyclopentanophenanthrene ring system (the ring system depicted in Formula II herein) and having one or more OH substituents, examples of which include, but are not limited to, campestanol, sitostanol which also known as β-sitostanol and stigmastanol, coprostanol, cholestanol and the like.

The food additive according to the invention is comprised of a sterol and/or stanol ester of a fatty acid wherein the ester is made by reacting a sterol and/or stanol with a fatty acid having from 6 to 22 carbon atoms in the presence of an effective amount of a catalyst selected from the group consisting of calcium oxide, calcium hydroxide, a calcium salt of a carboxylic acid, magnesium hydroxide and combinations thereof or a dicarboxylic acid ester of a sterol or stanol of the formula I. Since the catalyst is non-toxic and used at low levels, the sterol and/or stanol ester of the fatty acid can be added directly to foods without further processing such as removal of the catalyst. The sterol can be any sterol. Examples of suitable sterols include, but are not limited to, campesterol, ergosterol, stigmasterol, sitosterol or a combination thereof. A preferred sterol is β-sitosterol. A commercially available combination of sterols is GENEROL® 122N sterols as set forth herein. The stanol can be any stanol. Examples of suitable stanols include, but are not limited to, campestanol, sitostanol which is also known as β-sitostanol and stigmastanol, coprostanol, cholestanol and the like. A preferred stanol is β-sitostanol.

The amount of sterol and/or stanol fatty acid ester that can be used in the food additive is an effective amount which is any amount necessary to either reduce serum cholesterol in humans after ingestion of a food containing the food additive or an amount necessary to reduce the absorption of cholesterol from foods and/or beverages. A preferred food additive composition of the instant invention comprises from about 70% to about 80% vegetable oil, from about 1% to about 2% tocopherols, and from about 10% to about 25% sterol and/or stanol fatty acid ester prepared by the method according to the invention.

The food additive is prepared by combining a sterol and/or stanol ester of a fatty acid made by the process described herein and an edible solubilizing agent, an effective amount of a suitable antioxidant and an effective amount of a suitable dispersant. The solubilizing agent can be vegetable oil such as, for example, sunflower oil, palm kernel oil, coconut oil, rape seed oil, tallow, corn oil, canola oil, linseed oil, palm oil, olive oil, sesame oil, safflower oil, and the like, monoglycerides, diglycerides, triglycercides, tocopherols, and the like, and mixtures thereof. The antioxidant can be ascorbic acid (Vitamin C), tocopherols such as α-tocopherol (vitamin E), β-carotene, an extract of the bark of the maritime pine, Pinus maritima and combinations thereof. The extract of the bark of the maritime pine, also known as PYCNOGENOL™, contains procyanidines consisting of catechin and epicatechin units linked by C—C bonds to form dimers, trimers and other oligomers up to a chain length of 6–7 molecules and phenolic acids and its glucose derivatives. PYCNOGENOL™ is produced according to U.S. Pat. No. 4,698,360, which is incorporated herein for reference. The extract used according to the invention may be prepared essentially by extracting maritime pine bark in comminuted form with boiling water, saturating the filtered extract with sodium chloride or, alternatively, adding ammonium sulfate to 20% w/v, separating the precipitate formed, repeatedly extracting the supernatant with 1/10 volume of ethyl acetate, drying the collected ethyl acetate extracts, concentrating the dried extract, pouring it into 3 volumes of chloroform with stirring and collecting the precipitate which may be purified by repeating the dissolution in ethyl acetate and precipitation with chloroform. Mixtures of the above antioxidants can also be used.

A suitable dispersant is any biologically acceptable surface active agent, examples of which include, but are not limited to, an alkyl polyglycoside, lecithin, polysorbate 80, sodium lauryl sulfate, and the like. The alkyl polyglycosides which can be used in the invention have the formula V $$R_1O(R_2O)_b(Z)_a \qquad V$$

wherein $R_1$ is a monovalent organic radical having from about 6 to about 30 carbon atoms; $R_2$ is a divalent alkylene radical having from 2 to 4 carbon atoms; Z is a saccharide residue having 5 or 6 carbon atoms; b is a number having a value from 0 to about 12; a is a number having a value from 1 to about 6. Preferred alkyl polyglycosides which can be used in the compositions according to the invention have the formula I wherein Z is a glucose residue and b is zero. Such alkyl polyglycosides are commercially available, for example, as APG®, GLUCOPON®, PLANTAREN® or AGRIMUL® surfactants from Henkel Corporation, Ambler, Pa., 19002. Examples of such surfactants include but are not limited to:

1. GLUCOPON® 220 Surfactant—an alkyl polyglycoside in which the alkyl group contains 8 to 10 carbon atoms and having an average degree of polymerization of 1.5.
2. GLUCOPON® 225 Surfactant—an alkyl polyglycoside in which the alkyl group contains 8 to 10 carbon atoms and having an average degree of polymerization of 1.7.
3. GLUCOPON® 600 Surfactant—an alkyl polyglycoside in which the alkyl group contains 12 to 16 carbon atoms and having an average degree of polymerization of 1.4.
4. GLUCOPON® 625 Surfactant—an alkyl polyglycoside in which the alkyl group contains 12 to 16 carbon atoms and having an average degree of polymerization of 1.4.
5. APG® 325 Surfactant—an alkyl polyglycoside in which the alkyl group contains 9 to 11 carbon atoms and having an average degree of polymerization of 1.6.
6. PLANTAREN® 2000 Surfactant—an alkyl polyglycoside in which the alkyl group contains 8 to 16 carbon atoms and having an average degree of polymerization of 1.4.
7. PLANTAREN® 1300 Surfactant—an alkyl polyglycoside in which the alkyl group contains 12 to 16 carbon atoms and having an average degree of polymerization of 1.6.
8. AGRIMUL® PG 2067 Surfactant—an alkyl polyglycoside in which the alkyl group contains 8 to 10 carbon atoms and having an average degree of polymerization of 1.7.

Other examples include alkyl polyglycoside surfactant compositions which are comprised of mixtures of compounds of formula I as described in U.S. Pat. Nos. 5,266,690 and 5,449,763, the entire contents of both of which are incorporated herein by reference.

The method by which the novel food additive composition is used to reduce cholesterol absorption from foods and beverages includes the step of commingling the food additive composition with foods and beverages, mixing until uniformly blended. The novel food additive is effective as an additive in margarine, cooking oils or shortening for the purpose of reducing serum cholesterol in humans who ingest food products made with the novel additive. Margarine containing the novel food additive can be made by methods well known to those skilled. A general method for making margarine is disclosed in pages 77–84 of Volume 3 of Bailey's Industrial Oil and Fat Products (1985), the entire contents of which are incorporated herein by reference. The amount of sterol and/or stanol fatty acid ester useful in the novel food additive is an effective amount which is any amount necessary to either reduce serum cholesterol in humans after ingestion of a food containing the food additive or an amount necessary to reduce the absorption of cholesterol from foods and/or beverages. A preferred food additive composition of the instant invention comprises from about 70% to about 80% vegetable oil, from about 1% to about 2% tocopherols, and from about 10% to about 25% sterol and/or stanol fatty acid ester prepared by the method according to the invention. Particularly preferred compositions are composed of from about 70% to about 80% sunflower oil and/or rape seed oil, from about 1% to about 2% vitamin E and/or an extract of the bark of the maritime pine, Pinus maritima and from about 10% to about 25% of a sterol and/or stanol fatty acid ester prepared by the method according to the invention.

Another aspect of the invention pertains to a method of reducing the absorption of cholesterol into the bloodstream which comprises orally introducing into the body an effective amount of a substance containing a β-sitostanol ester made by reacting β-sitostanol and a carboxylic acid in the presence of an effective amount of a catalyst selected from the group consisting of calcium oxide, calcium hydroxide, a calcium salt of a carboxylic acid, magnesium hydroxide and combinations thereof. The cholesterol-lowering ability of fatty acid esters of β-sitostanol is described in U.S. Pat. No. 5,502,045, the entire contents of which are incorporated herein by reference. The fatty acid esters of β-sitostanol made by the process described herein can be orally introduced by ingesting food products containing the food additives of the present invention. Preferred methods of oral introduction of the β-sitostanol made by the process described herein is through the ingestion of margarine, cooking oils or shortening containing a food additive according to the invention. A particularly effective amount of β-sitostanol fatty acid esters is from about 0.2 to about 20 grams per day. Particularly preferred additives are composed of from about 70% to about 80% sunflower oil and/or rape seed oil, from about 1% to about 2% vitamin E and/or an extract of the bark of the maritime pine, Pinus maritima and from about 10% to about 25% of a β-sitostanol fatty acid ester prepared by the method according to the invention.

In regard to the esterification process used to make the sterol and/or stanol esters which can be used in the novel food additive, any aliphatic, cycloaliphatic, or aromatic mono- or poly-carboxylic acid having at least 2 carbon atoms or mixtures of such acids can be used in the process according to the invention. Examples of aliphatic monocarboxylic acids include, but are not limited to acetic, propionic, valeric, pelargonic, palmitic, lauric, oleic, linoleic acid, and the like. Examples of cycloaliphatic monocarboxylic acids include, but are not limited to cyclopentane carboxylic acid, cyclohexane carboxylic acid, cyclohexene carboxylic acid and the like. Examples of aromatic monocarboxylic acids include, but are not limited to benzoic acid, toluic acid, aminobenzoic acid and the like. Examples of aliphatic poly-carboxylic acids include, but are not limited to oxalic, malonic, adipic, azelaic acid, C-36 dimer acid, citric acid and the like. Examples of aromatic polycarboxylic acids include, but are not limited to phthalic acid, trimellitic acid and the like. Preferred carboxylic acids are mixtures of long chain carboxylic acids such as those derived from naturally occurring oils such as sunflower oil, palm kernel oil, coconut oil, rape seed oil, tallow, corn oil, canola oil, linseed oil, palm oil, olive oil, sesame oil, safflower oil, and the like which are known to those skilled in the art and are disclosed in chapter 6 of Volume 1 of the fourth edition (1979) of Bailey's Industrial Oil and Fat Products, the entire contents of which are incorporated herein by reference. Preferred fatty acid mixtures are those obtained from sunflower oil and rape seed oil.

The direct or transesterification modifications of the esterification processes can be carried out in the presence of a calcium oxide, calcium hydroxide, a calcium salt of a carboxylic acid, magnesium hydroxide catalyst or a combination of such catalysts. One advantage of the method according to the invention is that the calcium or magnesium catalysts can be left in the product or removed by contacting the reaction product with a chelating agent such as L-tartaric acid or EDTA. The preferred catalysts are calcium hydroxide, calcium oxide and the calcium salt of a fatty acid having from about 10 to about 22 carbon atoms. Calcium oxide is a particularly preferred catalyst. The amount that can be used is an effective amount which is any amount required to effect the conversion of a sterol or stanol to the corresponding ester. Typically, the amount will range from about 0.01% to 0.2% based on the total weight of the reaction mixture and will preferably be in the range of about 0.02% to about 0.05%.

The processes according to the invention can be carried out at a temperature in the range of from about 190° C. to about 210° C. The temperature for a particular reaction will depend upon a number of factors such as the nature of the catalyst, the equipment in which the reaction is carried out and whether a sterol or stanol is esterified or transesterified. If a sterol is used in the process according to the invention, a temperature in the range of 190° C. to about 210° C. is optimum. Such a temperature will minimize the dehydration of the sterol. If a stanol is used in the process according to the invention, a temperature up to about 210° C. is optimum.

The transesterification process according to the invention can be carried out using any type of carboxylic acid ester. Such esters include simple esters such as lower alkyl esters which include, for example, methyl, ethyl, propyl, or butyl esters or higher alkyl esters such as pentyl, hexyl, heptyl and the like or triglycerides which are triglyceryl esters of $C_{6-22}$ fatty acids such as conventional fats or oils. The transesterification conditions will vary according to the type of ester employed. If a glyceride is used, the temperature will be in the range of from about 210° C. to about 250° C., preferably from about 220° C. to about 230° C. If an ester of a lower molecular weight alcohol is used such as a methyl or ethyl ester such that the alcohol formed will be readily removed under the reaction conditions as, opposed to the use of a triglyceride where the glycerin formed is not as readily removed, the temperature will be in the range of from about 100° C. to about 130° C., preferably from about 110° C. to about 120° C.

The direct esterification process according to the invention can be carried out by mixing the reactants in a batch reactor and heating the reactor contents to an appropriate temperature to remove the water of reaction. This may be accomplished at atmospheric pressure or below. Another method of carrying out the process according to the invention is to pass the reaction mixture through an evaporator such as a thin film evaporator or wiped film evaporator operating at a pressure of about 2–3 millibars and at a temperature of about 230° C. while the reaction is taking place or after the reaction has been completed. It is preferable to operate the evaporator using an inert gas or vapor such as nitrogen or steam such that the inert gas or vapor contacts the thin film of reaction mixture in a counter-current fashion. The reaction mixture is passed through the evaporator one or more times in order to increase the surface to volume ratio to more efficiently remove the water of reaction thereby decreasing the time the reaction mixture spends at elevated reaction temperatures. One embodiment of the aforementioned method is a combination of a stirred tank reactor and an evaporator wherein the reactants are heated to reaction temperature and then repeatedly circulated through the evaporation means. An advantage of carrying out the process according to the invention on a commercial scale is that since no low molecular weight alcohol is produced as in, for example, transesterification of a methyl ester, there is no foaming in a reactor due to the evolution of the low molecular weight alcohol such as methanol. Therefore, the full working volume of the reactor can be utilized without an allowance for foam volume.

The process according to the invention is particularly useful for the preparation of dicarboxylic acid esters of sterols and/or stanols wherein the dicarboxylic acids are fully esterified or partially esterified. Such compounds have the formula I

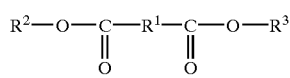

I wherein $R^1$ is an aliphatic or aromatic moiety having from one to about 36 carbon atoms. Examples of possible values of $R^1$ include, but are not limited to, branched and unbranched alkylene and alkenylene radicals having from 2 to 18 carbon atoms; dimer acid residues which are cycloaliphatic moieties having 34 carbon atoms; aromatic radicals and each of $R^2$ and $R^3$ is hydrogen, or a radical of the formula II or formula III

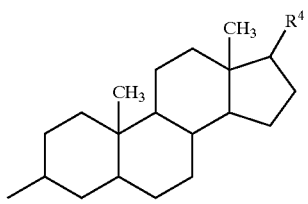

II

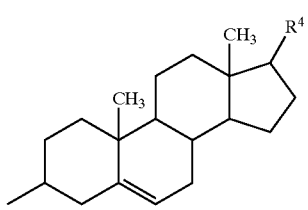

III wherein $R^4$ is an alkyl, substituted alkyl, alkenyl or substituted alkenyl group having from one to about 10 carbon atoms; each of $R^2$ or $R^3$ is independently hydrogen with the proviso that only one of $R^2$ or $R^3$ can be hydrogen. In the instances where only one of $R^2$ or $R^3$ is hydrogen refer to the partial or half esters of the dicarboxylic acids. These compounds are useful as for reducing serum cholesterol and LDL levels. Preferred compounds of the formula I include those wherein $R^1$ is an alkylene radical having from 2 to 18 carbon atoms with alkylene radicals having 7, 8, 10, and 11 carbons being especially preferred; each of $R^2$ and $R^3$ is a radical of the formula II wherein $R^4$ is an alkyl radical having from 2 to 10 carbon atoms. Preferred values of $R^4$ include a branched alkyl group having 10 carbon atoms. A most preferred $R^4$ is an alkyl group of the formula IV

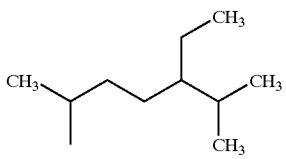

IV

Most preferred compounds of the formula I include the disitostanol ester of azelaic acid, the disitostanol ester of brassylic acid, the disitostanol ester of decanedioic acid, the disitostanol ester of dodecanedioic acid, the disitosterol ester of azelaic acid, the disitosterol ester of brassylic acid, the disitostanol ester of decanedioic acid and, the disitosterol ester of dodecanedioic acid, the sitostanol monoester of azelaic acid, the sitostanol monoester of brassylic acid, the sitostanol monoester of decanedioic acid, the sitostanol monoester of dodecanedioic acid, the sitosterol monoester of azelaic acid, the sitosterol monoester of brassylic acid, the sitostanol monoester of decanedioic acid and, the sitosterol monoester of dodecanedioic acid.

The following examples are meant to illustrate but not to limit the invention.

EXAMPLE 1

About 250 grams of sunflower fatty acid (acid value= 200.1) was added to a clean, dry vessel under nitrogen, heated to 130° C. with agitation and nitrogen sparge. About 357 grams of mixed stanols (hydrogenated GENEROL® 122N sterol ) was added at a rate slow enough to avoid cooling while agitating with a nitrogen sparge. This required about one half hour. After the addition of the stanol, 0.34 grams of calcium hydroxide was added and the pressure was gradually decreased to 27 inches, while the temperature was increased to 230° C. After six hours, the pressure was reduced to 40 mm Hg while maintaining the heat at 230° C. for another six hours. The reaction mixture was cooled under vacuum and the vacuum broken with nitrogen. The acid value at this point was 7.4. A solution of 2.7 grams of tartaric acid in 20 ml water was added to the crude product at 80° C. with agitation and nitrogen sparge. The mixture was then heated to 110° C. and 27 inches vacuum for a half hour to remove water. TONSIL® Optimum FF bleaching clay was then added under nitrogen, the mixture agitated for a half hour and filtered through a bed of CELITE® filter aid on a heated Buchner funnel. The batch lightened upon neutralization of the catalyst and filtration.

Analysis

Appearance
  Clear yellow liquid which sets up to a wax
  Color (Gardner): 5
  Acid Value: 7.35
  % Stanol: 4.4
  Ppm Calcium: 1

EXAMPLE 2

About 250 grams of sunflower fatty acid (acid value= 200.1) was added to a clean, dry vessel under nitrogen, heated to 130° C. with agitation and nitrogen sparge. About 357 grams of mixed sterols (GENEROL® 122N sterol) was added at a rate slow enough to avoid cooling while agitating with a nitrogen sparge. This required about one half hour. After the addition of the stanol, 0.34 grams of calcium oxide was added and the pressure was gradually decreased to 27 inches, while the temperature was increased to 210° C. After six hours, the pressure was reduced to 40 mm Hg while maintaining the heat at 230° C. for another six hours. The reaction mixture was cooled under vacuum and the vacuum broken with nitrogen. The acid value at this point was 7.4. A solution of 2.7 grams of tartaric acid in 20 ml water was added to the crude product at 80° C. with agitation and nitrogen sparge. The mixture was then heated to 110° C. and 27 inches vacuum for a half hour to remove water. TONSIL® Optimum FF bleaching clay was then added under nitrogen, the mixture agitated for a half hour and filtered through a bed of CELITE® filter aid on a heated Buchner funnel. The batch lightened upon neutralization of the catalyst and filtration.

EXAMPLE 3

A dicarboxylic ester is made by reacting one mole of a sterol or stanol with a ½ mole of a dicarboxylic acid in the presence of calcium oxide at 210 degrees under reduced pressure according to the procedure of Examples 1 and 2 above.

EXAMPLE 4

About 312 grams of sunflower fatty acid (acid value =200.1) was added to a clean, dry vessel under nitrogen, heated to 120° C. with agitation and nitrogen sparge. About 357 grams of GENEROL® 122N sterol was added at a rate slow enough to avoid cooling while agitating with a nitrogen sparge. This required about one half hour. After the addition of the GENEROL® 122N, 0.34 grams of calcium oxide was added and the pressure was gradually decreased to 30 mbar while the temperature was increased to 210° C. After six hours at 210° C. and <30 mbar, the reaction mixture was cooled under vacuum, and the acid value at this point was 22.2. A solution of 3.72 g tartaric acid in 23 g water was added to the crude product at 80° C. with agitation and nitrogen sparge. The mixture was then heated to 90° C. and 17 mbar for one hour. The vacuum was released with nitrogen, added 2 g of TONSIL® FF, 1.4 g of Clarcel DICB, evacuated to <30 mbar and filtered at 90° C. The batch lightened upon neutralization of the catalyst and filtration. The crude product contained 4.7% unreacted sterol via GC analysis.

What is claimed is:

1. A process for preparing an ester, said process comprising reacting at least one first reactant selected from the group consisting of sterols, stanols, and combinations thereof with at least one second reactant selected from the group consisting of carboxylic acids and carboxylic acid esters in the presence of a catalytically effective amount of a catalyst selected from the group consisting of calcium oxide, calcium hydroxide, a calcium salt of a carboxylic acid, magnesium hydroxide and combinations thereof.

2. The process according to claim 1, wherein the at least one first reactant comprises β-sitosterol.

3. The process according to claim 1, wherein the at least one first reactant comprises β-sitostanol.

4. The process according to claim 1, wherein the catalyst comprises calcium hydroxide, calcium oxide or a calcium salt of a carboxylic acid.

5. The process according to claim 1, wherein the at least one second reactant comprises a carboxylic acid having from about 2 to 22 carbon atoms.

6. The process according to claim 1, wherein the catalyst comprises calcium oxide.

7. The process according to claim 1, wherein the at least one second reactant comprises a mixture of long chain carboxylic acids derived from an oil selected from the group consisting of sunflower oil, palm kernel oil, coconut oil, rape seed oil, tallow oil, corn oil, canola oil, linseed oil, palm oil, olive oil, sesame oil, and safflower oil.

8. The process according to claim 1, wherein a reaction mixture comprising the at least one first reactant, the at least one second reactant and the catalytically effective amount of the catalyst is reacted in a reaction zone; and passing at least a portion of the reaction mixture through an evaporation zone to remove the water of reaction from the reaction mixture.

9. The process according to claim 8, further comprising returning the portion of the reaction mixture to the reaction zone.

10. The process according to claim 8, wherein the catalyst comprises calcium oxide.

11. The process according to claim 1, wherein the at least one second reactant comprises a carboxylic acid ester.

12. The process according to claim 11, wherein the at least one first reactant comprises β-sitosterol.

13. The process according to claim 11, wherein the at least one first reactant comprises β-sitostanol.

14. The process according to claim 11, wherein the catalyst comprises calcium hydroxide, calcium oxide or a calcium salt of a carboxylic acid.

15. The process according to claim 14, wherein the at least one second reactant comprises a carboxylic acid ester having from about 2 to 22 carbon atoms.

16. The process according to claim 14, wherein the at least one second reactant comprises a methyl ester of a $C_{6-22}$ fatty acid or a triglyceride.

17. A process which comprises reacting β-sitostanol with a carboxylic acid ester in the presence of an effective amount of calcium oxide.

18. A process for making a food additive composition, said process comprising:

(a) providing an edible solubilizing agent;

(b) providing an effective amount of a suitable dispersant;

(c) providing an ester prepared by reacting at least one first reactant selected from the group consisting of sterols, stanols, and combinations thereof with at least one second reactant selected from the group consisting of carboxylic acids and carboxylic acid esters in the presence of a catalytically effective amount of a catalyst selected from the group consisting of calcium oxide, calcium hydroxide, a calcium salt of a carboxylic acid, magnesium hydroxide and combinations thereof; and (d) combining the edible solubilizing agent, the suitable dispersant and the ester.

19. The process according to claim 18, further comprising providing an antioxidant and combining the antioxidant with the edible solubilizing agent, the suitable dispersant and the ester.

* * * * *